United States Patent
Glugla et al.

(10) Patent No.: US 9,528,490 B2
(45) Date of Patent: Dec. 27, 2016

(54) METHOD AND SYSTEM FOR PRE-IGNITION CONTROL

(71) Applicant: Ford Global Technologies, LLC, Dearborn, MI (US)

(72) Inventors: Chris Paul Glugla, Macomb, MI (US); Michael Damian Czekala, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/680,936

(22) Filed: Apr. 7, 2015

(65) Prior Publication Data

US 2015/0211473 A1    Jul. 30, 2015

Related U.S. Application Data

(63) Continuation of application No. 13/538,937, filed on Jun. 29, 2012, now Pat. No. 8,997,723.

(51) Int. Cl.
| | | |
|---|---|---|
| *F02P 9/00* | (2006.01) | |
| *F02D 41/00* | (2006.01) | |
| *F02P 3/045* | (2006.01) | |
| *F02P 5/15* | (2006.01) | |
| *F02D 37/02* | (2006.01) | |
| *F02D 41/04* | (2006.01) | |

(52) U.S. Cl.
CPC ............... *F02P 9/002* (2013.01); *F02D 37/02* (2013.01); *F02D 41/008* (2013.01); *F02D 41/04* (2013.01); *F02M 26/04* (2016.02); *F02M 26/43* (2016.02); *F02P 3/0453* (2013.01); *F02P 5/15* (2013.01); *F02P 5/1504* (2013.01); *Y02T 10/46* (2013.01)

(58) Field of Classification Search
CPC ........... F02P 5/04; F02P 5/1504; F02P 5/1508; F02P 5/1512; F02P 5/1516; F02P 9/002
USPC ................ 123/406.23–406.26, 609, 620
See application file for complete search history.

(56) References Cited

U.S. PATENT DOCUMENTS

| | | | |
|---|---|---|---|
| 4,219,250 A | | 8/1980 | Inada et al. |
| 4,454,718 A | | 6/1984 | Sakakibara et al. |
| 4,556,030 A | | 12/1985 | Aono |
| 4,649,888 A | * | 3/1987 | Kawai .................. F02P 3/0456 123/609 |

(Continued)

FOREIGN PATENT DOCUMENTS

| | | |
|---|---|---|
| CN | 101429916 A | 5/2009 |
| EP | 1400672 A3 | 10/1996 |

(Continued)

OTHER PUBLICATIONS

Partial Translation of Office Action of Chinese Application No. 2013102466815, Issued Oct. 27, 2015, State Intellectual Property Office of PRC, 11 Pages.

*Primary Examiner* — Lindsay Low
*Assistant Examiner* — Robert Werner
(74) *Attorney, Agent, or Firm* — Julia Voutyras; Alleman Hall McCoy Russell & Tuttle LLP (57) ABSTRACT

Methods and systems are provided for reducing late burn induced cylinder pre-ignition events. In response to a late burn combustion event in a cylinder, ignition coil dwell time is extended in the cylinder to reduce unintended combustion delays. In addition, pre-ignition mitigating actions are performed in a neighboring cylinder that may be prone to pre-ignition induced by the late combustion event.

19 Claims, 4 Drawing Sheets

(56) References Cited

U.S. PATENT DOCUMENTS

| | | | |
|---|---|---|---|
| 5,007,397 | A * | 4/1991 | Akasu .............. F02P 3/0456 123/406.51 |
| 5,048,487 | A * | 9/1991 | Fujimoto .............. F02P 5/1502 123/406.65 |
| 5,213,178 | A * | 5/1993 | Polidan .............. B60K 28/16 123/406.23 |
| 5,386,367 | A | 1/1995 | Ziegler et al. |
| 5,619,968 | A | 4/1997 | Hillsberg et al. |
| 5,905,193 | A | 5/1999 | Hashizume et al. |
| 6,044,824 | A | 4/2000 | Mamiya et al. |
| 6,105,552 | A | 8/2000 | Arisawa et al. |
| 6,354,264 | B1 | 3/2002 | Iwakiri et al. |
| 6,357,427 | B1 | 3/2002 | Luttrelll et al. |
| 6,543,419 | B2 | 4/2003 | Okamoto et al. |
| 6,561,163 | B1 | 5/2003 | Takahashi et al. |
| 6,705,277 | B1 | 3/2004 | McGee |
| 6,758,201 | B2 | 7/2004 | Hosoi |
| 6,769,625 | B2 | 8/2004 | Peterson, Jr. |
| 6,827,061 | B2 | 12/2004 | Nytomt et al. |
| 6,848,417 | B2 * | 2/2005 | Surnilla .............. F01N 13/011 123/339.11 |
| 6,883,497 | B2 | 4/2005 | Wozniak et al. |
| 7,043,350 | B2 | 5/2006 | Abe et al. |
| 7,128,048 | B2 | 10/2006 | Yamoaka et al. |
| 7,165,542 | B2 | 1/2007 | Masters et al. |
| 7,178,503 | B1 | 2/2007 | Brehob |
| 7,219,650 | B2 | 5/2007 | Nagano et al. |
| 7,275,519 | B2 | 10/2007 | Miyazaki et al. |
| 7,303,144 | B2 | 12/2007 | Alyanak |
| 7,461,633 | B2 | 12/2008 | Vangraefschepe et al. |
| 7,673,614 | B2 | 3/2010 | Inada et al. |
| 7,694,666 | B2 | 4/2010 | Lewis et al. |
| 7,721,710 | B2 | 5/2010 | Leone et al. |
| 7,730,872 | B2 | 6/2010 | Leone et al. |
| 7,921,833 | B2 | 4/2011 | Bidner et al. |
| 8,006,670 | B2 | 8/2011 | Rollinger et al. |
| 8,073,613 | B2 | 12/2011 | Rollinger et al. |
| 8,095,297 | B2 | 1/2012 | Glugla et al. |
| 8,171,912 | B2 | 5/2012 | Glugla et al. |
| 8,260,530 | B2 | 9/2012 | Rollinger et al. |
| 8,439,011 | B2 | 5/2013 | Glugla et al. |
| 8,447,502 | B2 | 5/2013 | Rollinger et al. |
| 9,043,122 | B2 | 5/2015 | Glugla et al. |
| 2005/0072402 | A1 | 4/2005 | Zurloye et al. |
| 2006/0243243 | A1 | 11/2006 | Fukasawa |
| 2007/0119425 | A1 | 5/2007 | Lewis et al. |
| 2007/0186903 | A1 | 8/2007 | Zhu et al. |
| 2007/0215069 | A1 | 9/2007 | Leone |
| 2008/0283023 | A1 | 11/2008 | Lewis et al. |
| 2009/0114188 | A1 | 5/2009 | Peters et al. |
| 2009/0165458 | A1 | 7/2009 | Matthews et al. |
| 2009/0292446 | A1 | 11/2009 | Tanaka |
| 2009/0308146 | A1 | 12/2009 | Gautrot et al. |
| 2010/0051379 | A1 | 3/2010 | Graves |
| 2010/0094528 | A1 | 4/2010 | Auclair et al. |
| 2010/0185378 | A1 | 7/2010 | Hillion et al. |
| 2010/0217504 | A1 | 8/2010 | Fujii et al. |
| 2011/0202260 | A1 | 8/2011 | Cunningham et al. |
| 2011/0265758 | A1 | 11/2011 | Glugla et al. |
| 2011/0313641 | A1 | 12/2011 | Glugla et al. |
| 2012/0035835 | A1 | 2/2012 | Glugla et al. |
| 2012/0245827 | A1 | 9/2012 | Glugla et al. |
| 2013/0139786 | A1 | 6/2013 | Glugla et al. |
| 2014/0000557 | A1 | 1/2014 | Glugla et al. |

FOREIGN PATENT DOCUMENTS

| | | |
|---|---|---|
| JP | 404008847 A | 1/1992 |
| JP | 2010037964 A | 2/2010 |
| JP | 2010209710 A | 9/2010 |

* cited by examiner

METHOD AND SYSTEM FOR PRE-IGNITION CONTROL

CROSS REFERENCE TO RELATED APPLICATIONS

The present application is a continuation of U.S. patent application Ser. No. 13/538,937, entitled "METHOD AND SYSTEM FOR PRE-IGNITION CONTROL," filed on Jun. 29, 2012, now U.S. Pat. No. 8,997,723, the entire contents of which are hereby incorporated by reference for all purposes.

FIELD

The present description relates generally to methods and systems for controlling a vehicle engine to reduce pre-ignition events.

BACKGROUND/SUMMARY

Engine control systems may use spark retard from MBT, or borderline spark settings, to provide fast response torque reduction. For example, spark retard may be used during transmission shifts to provide a smoother shift feel. Following the transmission shift, initial spark settings may be resumed. However, the retarded spark setting can lead to late combustion cycles wherein combustion occurs at a time or crank angle location later than intended. The late burn can potentially lead to abnormal combustion events such as misfires or pre-ignition events. Boosted engines may be more susceptible due to their higher sensitivity to ignition output requirements.

Accordingly, strategies have been developed for reducing pre-ignition onset by late combustion events. One example approach is shown by Wozniak et al. in U.S. Pat. No. 6,883,497. Therein, an engine controller determines if a cylinder misfire event has occurred in a cylinder due to spark retard in the cylinder. If no misfire occurs, a higher likelihood of pre-ignition is anticipated, and accordingly a mitigating operation is performed, such as cylinder fuel cut-off.

However, the inventors herein have identified a potential issue with such an approach. While the approach of Wozniak et al. may mitigate pre-ignition in the cylinder undergoing late combustion, the approach may be unable to address pre-ignition in other affected cylinders. Specifically, due to randomness of combustion preparation, there is a risk that the late combustion event in the given cylinder may be even later than intended. The later than intended initiation of combustion may raise the likelihood of pre-ignition in the given cylinder as well as in one or more neighboring cylinders. For example, the late combustion event in the given cylinder may introduce high amount of hot exhaust residuals into one or more adjacent cylinders by forcing open the exhaust valve of the adjacent cylinder(s). The excess hot residual received in the adjacent cylinders can increase their propensity for pre-ignition. In addition, the excess hot residual can increase the amount of fresh cylinder charge inducted (via turbine spinning), leading to a further increase in the propensity for pre-ignition. Consequently, engine degradation may occur.

Thus in one example, some of the above issues may be addressed by an engine method comprising, in response to timing of combustion in a cylinder being later than a threshold, selectively increasing spark ignition output for the combustion. In this way, unintended combustion delays may be reduced.

For example, during a transmission shift, transient torque control may be enabled by retarding spark timing. If spark timing in a cylinder is retarded more than a threshold amount, there may be a risk that the cylinder combustion timing will be even later than intended. Thus, in response to the spark retard applied being more than the threshold amount, a dwell time of the ignition coil of the cylinder may be extended so as to temporarily increase the ignition output. The dwell time may be increased as a distance of the retarded spark timing from a threshold timing increases. For example, the dwell time may be increased with a factor that is based on the torque reduction ratio achieved via the spark retard. The increased ignition output may be applied for the given cylinder combustion event so as to better enable the combustion event to start at a desired timing, and not be further delayed. Then, during a subsequent combustion event, where spark timing with less retard is resumed, the ignition dwell time may be lowered.

In this way, by temporarily increasing spark ignition output in a cylinder operating with spark retard, combustion timing delays incurred due to randomness of combustion preparation can be reduced. By improving the likelihood that a cylinder combustion event will occur at a desired timing, and not any later, pre-ignition in the given cylinder, as well as in a cylinder configured to receive exhaust residuals from late combustion in the given cylinder, may be reduced. Overall, engine degradation due to pre-ignition can be mitigated.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
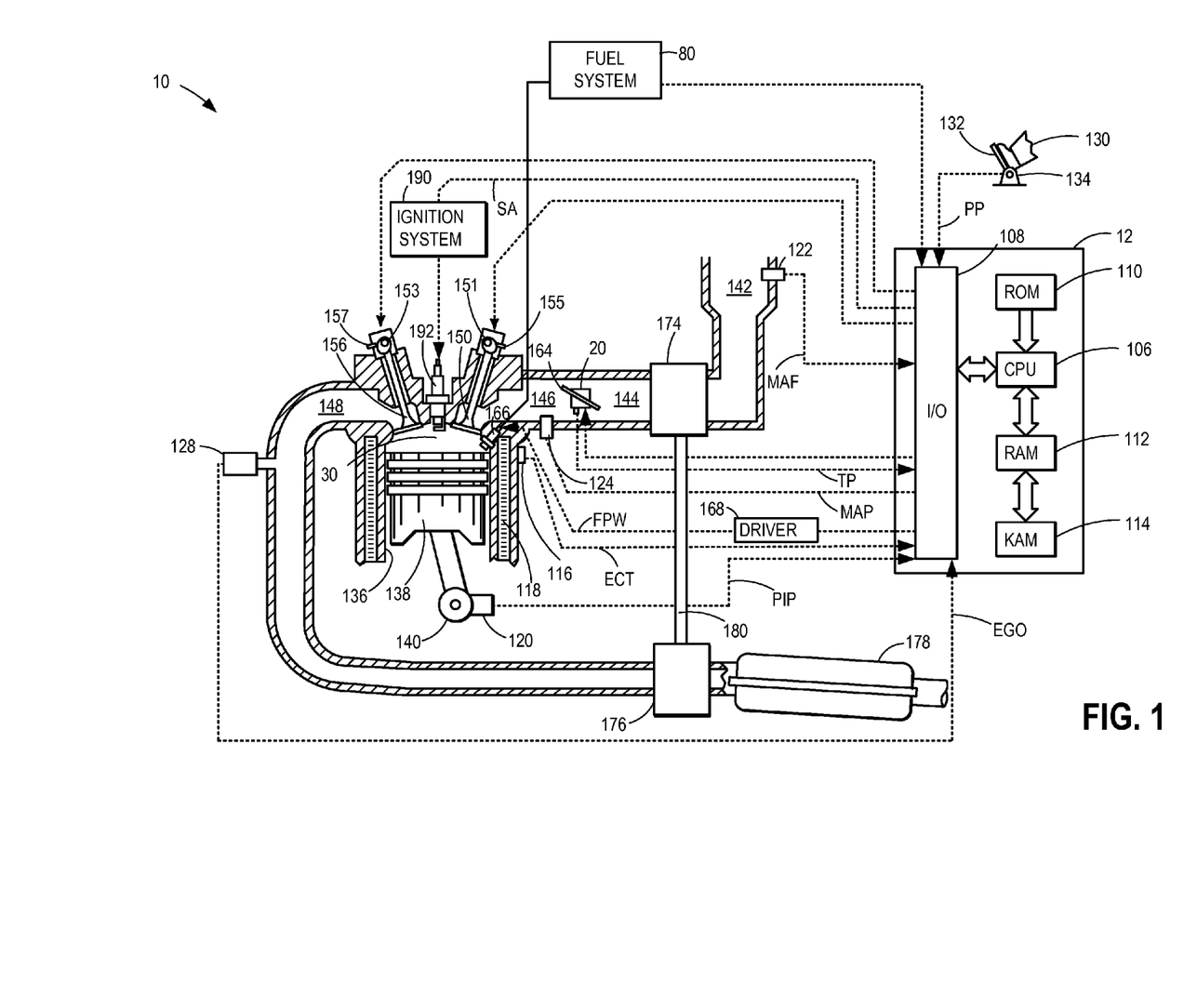
FIG. 1 shows a schematic diagram of an internal combustion engine.

The following description relates to systems and methods for modulating spark energy output during combustion in a cylinder as a function of ignition timing retard so as to reduce late burn induced pre-ignition events in an engine system, such as the engine system of FIG. 1. An ignition system of the engine (such as the ignition system of FIG. 2) may be modulated so that the spark ignition output is temporarily increased during late combustion events. An engine controller may be configured to perform a control routine, such as the routine of FIG. 3, to increase a spark ignition coil dwell time in a cylinder based on a torque reduction ratio achieved at a retarded spark ignition timing. In this way, additional unintended delays in combustion timing can be reduced. Example spark ignition output adjustments are described with reference to FIG. 4. By increasing an ignition coil dwell time in a cylinder undergoing late burn, late burn induced pre-ignition events in the given cylinder, as well as a neighboring cylinder receiving hot residuals from the given cylinder, may be reduced.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Combustion chamber (i.e. cylinder) 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of a vehicle via an intermediate transmission system. Further, a starter motor may be coupled to crankshaft 140 via a flywheel to enable a starting operation of engine 10.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 can receive exhaust gases from other cylinders of engine 10 in addition to cylinder 30. In one example, exhaust passage 148 may receive exhaust from all the cylinders of engine 10. However, in some embodiments, as elaborated at FIG. 2, the exhaust from one or more cylinders may be routed to a first exhaust passage, while the exhaust from one or more other (remaining) cylinders may be routed to a second, different exhaust passage, the distinct exhaust passages then converging further downstream, at or beyond an exhaust emission control device. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines. Further details regarding the ignition system of FIG. 1 are provided in FIG. 2.

In some embodiments, each cylinder of engine 10 may be configured with one or more fuel injectors for providing fuel thereto. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel may be delivered to fuel injector 166 via a high pressure fuel system 80, including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 30.

As described above, FIG. 1 shows only one cylinder of a multi-cylinder engine. As such each cylinder may similarly include its own set of intake/exhaust valves, fuel injector(s), spark plug, etc.

Fuel tanks in fuel system 80 may hold fuel with different fuel qualities, such as different fuel compositions. These differences may include different alcohol content, different octane, different heat of vaporizations, different fuel blends, and/or combinations thereof etc. Example fuels include E85 (which includes a mixture of approximately 85% ethanol and 15% gasoline), E10 (which includes a mixture of approximately 10% ethanol and 90% gasoline), 100% gasoline, or a variety of blends there-between. Still other fuels include methanol, diesel, hydrogen, biodiesel, etc.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold. Still other sensors such as cylinder pressure sensors, knock sensors, and/or pre-ignition sensors may be coupled to engine 10 (e.g., to a body of the engine) to help in the identification of abnormal combustion events.

Storage medium read-only memory 110 can be programmed with computer readable data representing instructions executable by processor 106 for performing the methods described below as well as other variants that are anticipated but not specifically listed.

Figure 2:
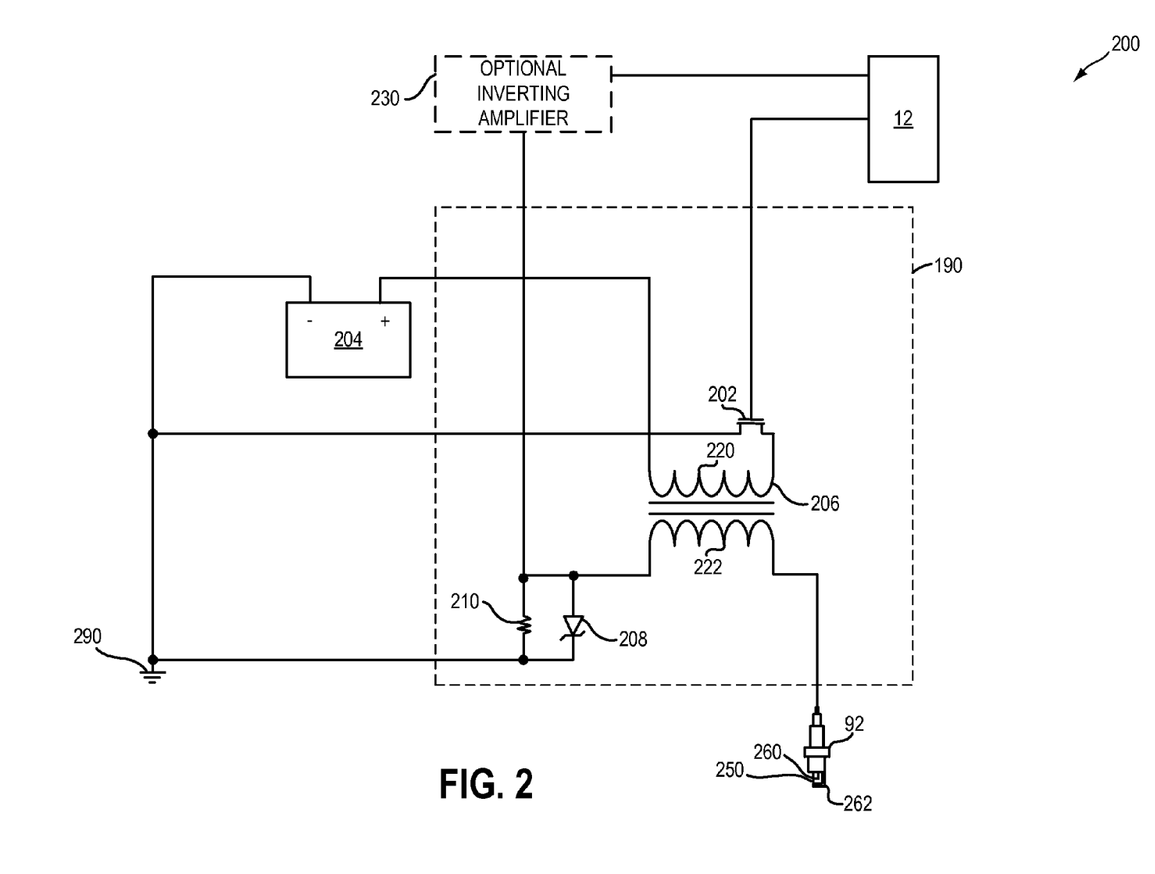
FIG. 2 shows an ignition system for the engine of FIG. 1.

Referring now to FIG. 2, an example circuit for modulating a spark ignition output during combustion in a cylinder is shown. The circuit of FIG. 2 may be included in the system of FIG. 1.

Battery 204 supplies electrical power to ignition system 190 and controller 12. Controller 12 operates switch 202 to charge and discharge ignition coil 206. Ignition coil 206 includes primary coil 220 and secondary coil 222. Ignition coil 206 charges when switch 202 closes to allow current to flow from battery 204 to ignition coil 206. Ignition coil 206 discharges when switch 202 opens after current has been flowing to ignition coil 206.

Secondary coil 222 supplies energy to spark plug 92. Spark plug 92 generates a spark when voltage across electrode gap 250 is sufficient to cause current to flow across electrode gap 250. Spark plug includes center electrode 260 and a side electrode 262. Voltage is supplied to center electrode 260 via secondary coil 222. Side electrode 262 is electrically coupled to ground 290. Sense resistor 210 is electrically coupled in series with spark plug 92 through secondary coil 222. Zener diode 208 is electrically coupled in parallel with sense resistor 210. Zener diode 208 is reverse biased when ignition coil 206 charges and is forward biased to ground 290 during the spark.

A voltage develops across sense resistor 210 when current flows into primary coil and a field develops within ignition coil 206. Voltage across sense resistor 210 may be provided to optional amplifier 230 which inverts sense resistor voltages. In this way, the sensed voltages may be converted to positive voltages. Further, the present example shows a negative firing ignition coil. However, the circuitry is also applicable to a positive firing ignition coil, wherein the polarity of zener diode 208 is reversed and the sensed voltage across sense resistor 210 is also reversed.

In the ignition system of FIG. 2, a duration of charging of ignition coil 206, herein also referred to as an ignition coil dwell time, may be adjusted to modulate a spark energy that is output. In particular, by increasing the ignition coil dwell time, a peak coil current is increased, and a spark energy that is output can be increased. During regular engine operation, however, a relatively lower spark energy is used to enable spark generation and initiation of combustion. In particular, a shorter ignition dwell time is used, which enables a lower peak coil current to be attained, and a lower spark energy to be output. This is because continually operating the ignition system at the highest ignition output can prematurely degrade the ignition system. Specifically, due to the large amount of power and heat generated at the spark plug, continual operation at the highest ignition output can lead to premature erosion of the spark plug gap.

Applicants have recognized that during some engine operating conditions, where spark timing is retarded from MBT, combustion timing may be retarded further from MBT unintentionally, and pre-ignition can occur. For example, during transient torque requests (e.g., in response to a sudden drop in torque demand), torque control may be achieved by modifying engine parameters from nominal settings and retarding spark ignition timing. The spark retard allows substantially immediate torque reduction to be achieved (e.g., during a transmission shift). However, due to randomness of combustion preparation, the actual combustion timing may be later than anticipated. The later than intended combustion event can generate a large amount of hot exhaust residuals in the cylinder. This increases the propensity for misfire and pre-ignition events in the firing cylinder. In addition, if sufficiently late, the temperature and pressure of the exhaust residuals may become significantly elevated. When received in a neighboring cylinder, the hot residuals may also increase the recipient cylinder's propensity for pre-ignition. The cascading pre-ignition events can rapidly degrade the engine. The problem may be further exacerbated in boosted engines which are more sensitive to ignition output requirements as they need higher outputs to achieve combustion with the higher cylinder pressures.

Figure 3:
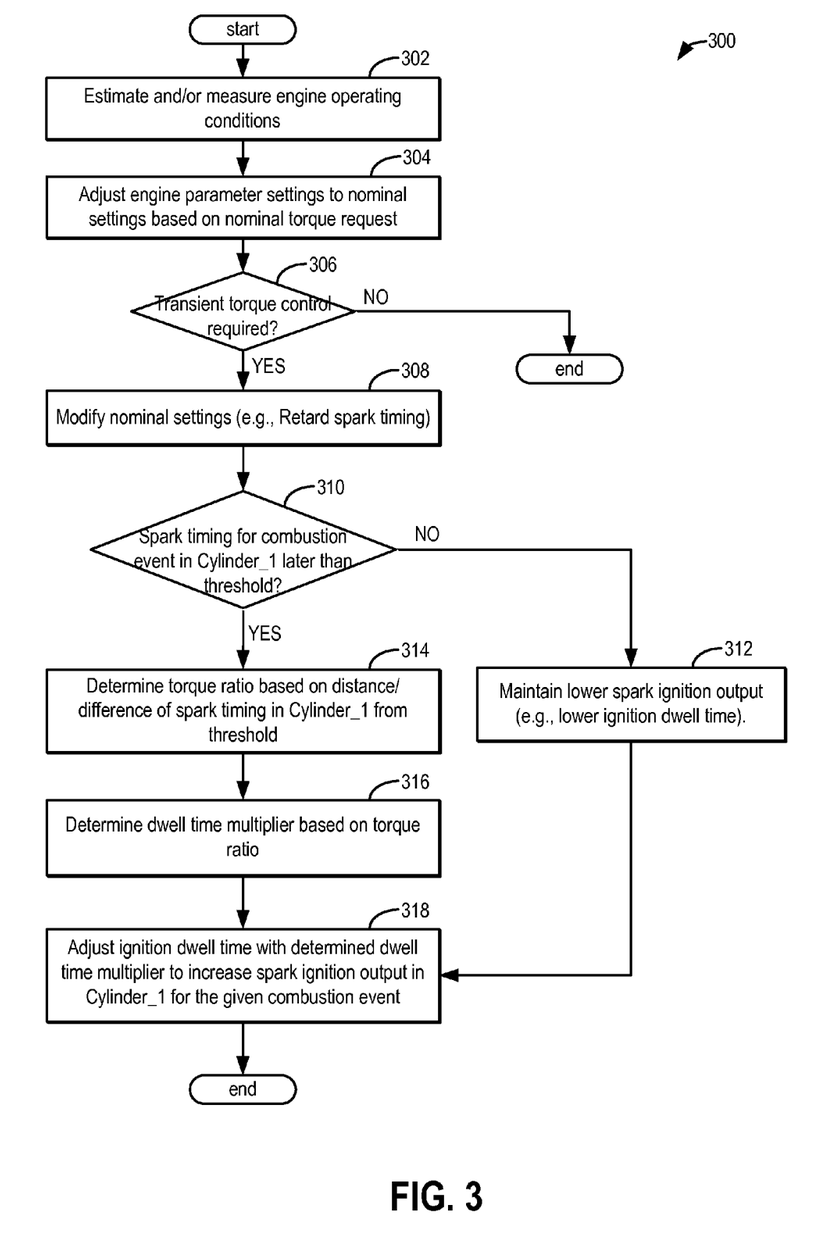
FIG. 3 shows a high level flow chart for adjusting a spark ignition output responsive to a late cylinder combustion timing.

As elaborated herein at FIG. 3, by modulating spark energy output based on the ignition timing retard from a threshold timing (e.g., from MBT or borderline spark), a higher spark energy output can be provided. The higher spark output energy, in turn, better enables cylinder combustion to occur substantially as soon as the ignition coil is discharged and spark is generated at the spark plug. In other words, this allows a cylinder combustion event to occur at an intended combustion timing, but not later. The spark energy output may be modulated as a function of the ignition timing retard from the threshold timing, or from MBT. Alternatively, the spark energy output may be modulated as a function of a torque reduction ratio (herein also referred to as a torque ratio) achieved at the retarded spark timing. A controller may identify if combustion timing in a cylinder is beyond a threshold timing, outside of which the likelihood of further combustion delays are possible. If so, the controller may temporarily increase the ignition output for that combustion event in the given cylinder by increasing a duration of charging of the ignition coil. Alternatively, the controller may determine a torque (reduction) ratio achieved at the retarded spark ignition timing and adjust the ignition dwell time with a factor (e.g., adder or multiplier) that is based on the determined torque ratio. For example, as the torque ratio falls below a threshold (that is, as more than a threshold amount of torque reduction is achieved), the ignition coil dwell time and spark ignition energy output may be increased. The increased ignition output reduces the likelihood of unintended combustion delays. In particular, the temporarily increased ignition coil dwell time better enables a cylinder combustion event with an amount of spark retard (that is more than a threshold amount) to occur closer to a time at which the ignition coil is discharged rather than later. By reducing unintended combustion timing delays, pre-ignition events can be pre-empted.

In addition, one or more pre-ignition mitigating actions may be performed in the given cylinder as well as in a neighboring cylinder receiving hot exhaust residuals from the late combusting cylinder. This may include, for example, selectively deactivating fuel injection to the cylinder receiving the late burn residuals. As another example, fuel injection to the cylinder receiving the late burn residuals may be enriched, with a degree of richness of the enrichment based on the ignition timing retard (relative to the threshold).

Thus, the engine system of FIGS. 1-2 enables a method for an engine wherein in response to a combustion timing is a cylinder being later than a threshold (such as, in response to the combustion timing being retarded beyond a threshold timing, or with more than a threshold amount of spark retard), a spark ignition output for combustion in the cylinder is temporarily and selectively increased. Specifically, as a torque reduction ratio at the retarded ignition timing falls below a threshold, a ignition coil dwell time is extended with a factor that is based on a distance of the torque ratio from a threshold. By adjusting spark output in the firing cylinder, unintended combustion delays may be reduced, thereby reducing the risk of cylinder pre-ignition events in the firing cylinder. In addition, the risk of late burn induced pre-ignition events in neighboring cylinders is also reduced.

Now turning to FIG. 3, an example routine 300 is depicted for modulating spark ignition output during late combustion events. By increasing an ignition coil dwell time when spark timing is retarded beyond a threshold, unintended delays may be reduced and late burn induced pre-ignition events may be pre-empted.

At 302, the routine includes estimating and/or measuring engine operating conditions. These include, for example, engine speed and load, torque demand, boost, manifold pressure (MAP), manifold aircharge temperature (MCT), air-fuel ratio (lambda), fuel alcohol content, barometric pressure, ambient conditions (e.g., ambient temperature, pressure, humidity, etc.), engine pre-ignition history, etc. At 304, engine parameter settings may be adjusted based on the estimated engine operating conditions. For example, based on a nominal torque request, engine parameter settings of boost level, (intake and/or exhaust) valve timing, spark ignition timing, etc., may be set to nominal settings. As an example, spark timing may be set to MBT or borderline spark.

At 306, it may be determined if a transient torque control is required. For example, it may be determined if there is a transient over-torque condition. Herein, it may be determined if a sudden drop in torque demand has occurred and the available torque is more than the demanded torque. Transient over-torque conditions may occur during a tip-out or a transmission shift, for example. During such conditions, a transient torque reduction may allow the torque to be temporarily reduced thereby providing a smoother shift feel. As further examples, transient over-torque conditions may occur due to engine idle speed over-speed conditions, or due to a transient change in requested EGR. In alternate examples, it may be determined if there is a transient under-torque condition at 308. Transient under-torque conditions may occur during a tip-in, for example. If there is no transient torque change requirement, the routine may end.

At 308, based on the need for transient torque control, the nominal engine parameter settings may be adjusted. As an example, if the transient torque control is requested to provide torque reduction in response to a transient over-torque condition, the controller may provide the torque reduction by, as non-limiting examples, lowering a boost level, adjusting EGR valve settings (e.g., to increase EGR delivered to the engine while decreasing fresh intake air delivered to the engine), adjusting intake and/or exhaust valve timings, and retarding spark timing (from MBT or borderline spark settings), etc. In one example, a feedback torque controller may be configured to move the engine parameter settings from the nominal settings in response to the over-torque condition. The nominal settings may be temporarily adjusted to provide the torque reduction and then returned to the original (nominal) settings. For example, spark timing may be temporarily retarded from MBT and then returned back to the nominal setting.

As such, spark retard from MBT or borderline spark settings may be advantageously used to provide a fast (substantially immediate) torque reduction response. This allows transient torque control to be rapidly achieved. However, the actual combustion timing can be further retarded from the desired timing due to randomness of combustion preparation. This may include, for example, additional (unintended) combustion timing delays incurred due to fuel preparation, randomness of in cylinder motion, and randomness of actual spark discharge across the gap. While additional combustion delays may be tolerated during some engine operating conditions, during other conditions, the additional delay can lead to significantly late combustion burning cycles in the engine which raises the propensity for engine pre-ignition events. Specifically, the desired spark retard can lead to a late combustion event wherein cylinder combustion occurs at a time or crank angle location that is later than was intended. In some engine configurations, such as with a boosted engine, the late combustion may be much later than intended.

The late combustion in a cylinder can lead to the generation of hot exhaust residuals in the firing cylinder, as well as high exhaust manifold pressures. If a large amount of hot residuals are generated in the firing cylinder, the residuals can not only lead to abnormal combustion events (such as misfires and/or pre-ignition events) in the given cylinder, but can also lead to abnormal combustion events in one or more neighboring cylinders. Specifically, the large amount of hot residuals can be received in a neighboring cylinder during the valve overlap period. Alternatively, the hot residuals can force open the exhaust valve of a neighboring cylinder. In either case, the hot residuals can substantially raise the temperature in the cylinder receiving the residuals, and make that cylinder prone to pre-ignition. The problem may be exaggerated in engines configured with small volume exhaust manifolds (such as those used to reduce turbo lag issues).

Accordingly, at 310, it is determined if there is a late combustion event in a first cylinder (Cylinder_1). In particular, based on the modified engine parameter settings, it may be determined if spark ignition timing for combustion in the first cylinder is later than a threshold (e.g., later than a threshold timing). Alternatively, it may be determined if an amount of spark retard to be applied during combustion in the first cylinder is more than a threshold amount (e.g., more than 10 degrees of spark retard. Herein, the threshold timing (or threshold amount) may be based one or more of a cylinder load of the first cylinder, an amount of EGR in the first cylinder, and an amount and temperature of exhaust residuals in the first cylinder. For example, if the cylinder already has an amount of EGR, a lower threshold (or an earlier threshold timing that is closer to MBT) may be used while a higher threshold (or a later threshold timing that is further from MBT) may be applied as the amount of EGR in the cylinder decreases. Likewise, if the amount of residuals expected to be generated in the first cylinder at the desired amount of spark retard is larger, the threshold may be lowered to reduce the likelihood of excess residuals being delivered to a second (neighboring) cylinder.

In one example, to determine the amount of residuals expected to be generated, a measurement of the lateness of combustion may be required. The lateness may be based on an expected location or timing of the cylinder combustion event. This may be based on, for example, a peak pressure location or a location of a percentage of mass fraction burned. Based on the ratio of the actual burn location to the desired or expected burn location, an adaptive dwell factor may be determined that is added or multiplied to the ignition dwell time for each cylinder that produces late combustion.

The threshold may also be adjusted based on a pre-ignition history of the first (firing) cylinder as well as the second (neighboring) cylinder receiving exhaust residuals from the first cylinder. For example, if the first firing cylinder has a historic propensity for pre-ignition (e.g., if a pre-ignition count of the first cylinder is higher than a threshold number), a lower threshold (or an earlier threshold timing closer to MBT) may be used, thereby limiting the amount of late burn possible in the firing cylinder. As another example, if the second cylinder has a historic propensity for pre-ignition (e.g., if a pre-ignition count of the second cylinder is higher than a threshold number), a lower threshold may be used, thereby limiting the amount of late burn residuals received in the second cylinder. In still other examples, the threshold timing may be MBT or borderline spark settings.

While the above example suggests learning the late combustion event in the cylinder based on a cylinder spark ignition timing relative to a threshold, it will be appreciated that in alternate embodiments, the late cylinder combustion event may be inferred based on one or more of the cylinder's (intake and/or exhaust) valve timing, spark plug ionization current, crankshaft acceleration, and cylinder pressure.

If the spark timing for combustion in the first cylinder is not later than the threshold, then at 312, the method includes maintaining a lower spark ignition output. That is, the cylinder is operated with the requested spark retard and by charging a spark ignition coil for a shorter duration (or dwell time), to a lower peak coil current, and with a lower ignition output. As such, the ignition coil is configured to supply electrical energy to a spark plug. Thus, by lowering the ignition coil dwell time and the peak coil current, the spark ignition output is lowered. Ignition is then provided at the requested spark timing. A cylinder combustion event may then occur after a (longer) duration since the spark event.

In comparison, if the spark timing for combustion in the first cylinder is later than the threshold, then at 314, the method includes determining a torque ratio at the requested ignition timing. The torque ratio reflects a reduction in torque achieved at the retarded ignition timing relative to the threshold timing. As an example, the torque ratio may be based on a distance or difference of the spark timing of combustion in the first cylinder from the threshold. In one example, a distance or difference of the requested spark ignition timing from MBT or borderline spark settings may be determined and a torque ratio may be determined based on the distance or difference from MBT. As such, as spark timing is retarded from MBT, torque is reduced non-linearly (e.g., as a quadratic function). Thus, as a non-limiting example, a torque ratio at MBT would be 1 (that is, no torque reduction) while at a spark retard of 12 CAD, the torque ratio may be 0.9 (that is, 10% torque reduction). Then, at 316, an adaptive dwell factor may be determined as a function of the determined torque ratio. The dwell factor may be a multiplier or an adder that is used to increase an ignition dwell time (e.g., a base ignition dwell time). For example, where the factor is a multiplier, at torque ratios of 1 (or near 1), the multiplier may be 1, while at torque ratios of 0.7 (that is, 30% reduction), the multiplier may be 1.3. It will be appreciated that in alternate embodiments, the adaptive dwell factor may be determined directly as a function of the difference between the spark timing and the threshold (e.g., as a distance from MBT or borderline spark).

Then, at 318, the method includes selectively increasing spark ignition output for the combustion in the first cylinder. In particular, increasing the spark ignition output includes extending a dwell time of a spark ignition coil by adjusting the ignition dwell time with the adaptive dwell factor. As elaborated above, the adaptive dwell factor may be a multiplier or an adder. In this way, by adjusting the ignition dwell time with the adaptive dwell factor, the increase in spark ignition output is essentially adjusted as a function of the distance/difference of the spark timing from the threshold. In particular, as the distance of the spark timing from the threshold timing increases, a larger amount of torque reduction is achieved, and the ignition dwell time is extended with a larger adaptive dwell time factor. Since the ignition coil is configured to supply electrical energy to a spark plug, by extending the ignition coil dwell time, a higher peak coil current delivered to the spark plug is achieved and the spark ignition output is increased.

In one example, an engine controller may provide the torque ratio as an input to a software table and a corresponding adaptive dwell time factor (multiplier or adder) may be output. In an alternate example, however, the engine controller may provide the distance from the threshold timing as input to a software table and a corresponding adaptive dwell factor may be generated. In one example, the dwell time may be extended further (that is, to a later timing after a longer duration) as a difference of the combustion timing of the firing cylinder (first cylinder) from the threshold timing increases. In another example, the dwell time may be extended further (that is, to a later timing after a longer duration) as a difference of the torque ratio (achieved due to the selected spark timing) in the firing cylinder from a threshold torque ratio (e.g., from a torque ratio of 1) increases. Increasing the dwell time may include initiating charging of the ignition coil at an earlier time so that the spark coil can be discharged, and spark can be generated, at the requested ignition timing. Increasing the dwell time may also include charging the ignition coil to a higher peak coil current and then discharging the coil at the requested ignition timing from the higher peak coil current. The higher ignition output may better enable an ensuing combustion event to occur without unintended delays.

In an alternate embodiment, instead of determining if the spark timing is retarded from the threshold at 310, the routine may determine a torque ratio for each cylinder combustion event, and adjust the ignition dwell time based on that torque ratio for each cylinder combustion event. For example, the routine may be continuously run in an open-loop fashion to adaptively adjust the ignition dwell time for each cylinder combustion event based on the torque ratio of that cylinder combustion event, which in turn is based on the amount of spark retard requested for that cylinder combustion event. Thus, the requested spark retard may be provided by charging the spark ignition coil for a longer duration (or dwell time), to a higher peak coil current, and with a higher ignition output. Ignition is then provided at the requested spark timing. A cylinder combustion event may then occur after a (shorter) duration since the spark event. For example, the cylinder combustion event may occur immediately after spark is generated at the spark plug. In this way, the higher ignition output better enables the cylinder combustion event to occur without unintended retarded delays.

It will be appreciated that the extended dwell time may be applied only for the given late combustion event and regular (un-extended) ignition dwell times may be resumed for subsequent cylinder combustion events. In particular, where the combustion in the first cylinder is a first combustion event, temporarily increasing spark ignition output includes increasing spark ignition output for the first combustion event in the first cylinder and resuming spark ignition output for a second, subsequent combustion event in the first cylinder. In this way, selective increasing of ignition output is performed to reduce a likelihood of pre-ignition and/or misfire in the first cylinder as well as a second cylinder receiving exhaust residuals from the first cylinder.

In some embodiments, an engine controller may also take further pre-ignition mitigating actions in the second cylinder to further reduce the likelihood of pre-ignition in the second cylinder receiving the late burn residuals. For example, an engine controller may selectively enrich the second cylinder based on the requested spark ignition timing in the first cylinder or the torque ratio achieved in the first cylinder at the requested spark ignition timing. Herein, a degree of richness of the selective fuel enrichment may be increased as a difference of the ignition timing in the first cylinder from the threshold increases. Alternatively, the degree of richness of the fuel enrichment to the second cylinder may be increased as a distance between the torque ratio at the retarded spark timing and a threshold ratio increases. The fuel enrichment in the second cylinder allows a temperature of the hot residuals received in the second cylinder to be cooled, in situ. By lowering at least the temperature of the received residuals, a likelihood of pre-ignition in the second cylinder, induced by the hot residuals received therein, may be reduced.

In some embodiments, the performing of additional pre-ignition mitigating steps in the cylinder receiving exhaust residuals may be based on the load of the first firing cylinder. For example, at lighter loads, a late combustion event in the first cylinder may not generate enough exhaust pulsations to affect neighboring cylinders. Thus, at lighter or lower loads (e.g., a cylinder load that is below a threshold load), a late combustion event in a first firing cylinder may not be accompanied by a pre-ignition mitigating fuel adjustment in a second cylinder receiving exhaust residuals from the first cylinder. In comparison, at higher loads, (e.g., a cylinder load that is above the threshold load), a late combustion event in the first firing cylinder may be accompanied by a pre-ignition mitigating fuel adjustment in the second cylinder to reduce the likelihood of cylinder pre-ignition or misfire events.

Likewise, in some embodiments, the extension of ignition coil dwell time may be performed based on the torque reduction (that is, the torque ratio resulting from the selected spark timing) as well as the cylinder load. For example, if the spark timing is retarded beyond a threshold or a torque ratio is lower than a threshold (that is, there is significant torque reduction) and the engine load is low, a late combustion event may not be delayed too much and there may not be enough exhaust pulsations generated to affect the firing cylinder as well as neighboring cylinders. Thus, during these conditions, even though torque is reduced and spark is retarded, ignition coil dwell time may not be extended, or may be extended less. In another example, if the spark timing is retarded beyond the threshold or the torque ratio is lower than the threshold (that is, there is significant torque reduction) and the engine load is high, a late combustion event may be delayed more than intended and there may be enough exhaust pulsations generated to affect the firing cylinder as well as neighboring cylinders. Thus, during these conditions, while torque is reduced and spark is retarded, ignition coil dwell time may be extended (e.g., extended more) with the adaptive dwell time factor. Additionally, the ignition dwell factor used at the low load conditions may be different from (e.g., smaller than) the ignition dwell factor used at the high load conditions.

In still further embodiments, in response to an actual misfire or pre-ignition event in the first firing cylinder operating with the retarded spark timing, the controller may adaptively learn and adjust the ignition coil dwell time of that cylinder during a future combustion event wherein the cylinder is operating with spark retard. For example, in response to a misfire or pre-ignition event in the first cylinder during cylinder operation with retarded spark timing, low load, and lower ignition spark output, the controller may operate the first cylinder during future combustion events at retarded spark timing and low load with a higher ignition spark output (e.g., with a longer ignition coil dwell time). Likewise, in response to an actual misfire or pre-ignition event in the second firing cylinder receiving exhaust residuals from the first cylinder, the controller may adaptively learn and adjust the fuel injection and ignition coil dwell time of the second cylinder during future combustion events.

While the above example illustrates increasing spark ignition output by extending an ignition coil dwell time, it will be appreciated that in alternate examples, the spark ignition output may also be extended by increasing a number of times the ignition coil is charged and discharged over a single ignition event. That is, a multi-strike ignition operation may be performed wherein the ignition coil is strike multiple times (e.g., 5 times) in close succession over the same ignition event.

While the method of FIG. 3 shows adjusting the spark ignition output in response to retarded spark timing identified during transient torque control conditions, it will be appreciated that in alternate embodiments, combustion timing or spark timing may additionally be monitored during conditions of high air mass flow. As such, during high air mass flow conditions, an exhaust manifold volume may also affect the likelihood of late-burn induced pre-ignition events. In particular, in engines configured with smaller exhaust manifolds (e.g., for reducing turbo lag), during high air mass flow conditions, unintended delays in spark timing may be likely and a propensity for pre-ignition may be higher. Accordingly, during such high air mass flow conditions, a threshold relative to which the combustion timing is assessed may be lowered (that is, a threshold timing may be advanced towards MBT) and the ignition coil dwell time may be further extended (e.g., adjusted with a larger multiplier or adder function). As an example, the ignition dwell time factor (adder or multiplier) may be determined using a 3-dimensional look-up table where is it saved as a function of load and torque ratios and calibrated in such a way that additional dwell factors/multipliers would be utilized under high load conditions.

In one example, during an over-torque condition, an engine controller may reduce engine combustion torque by retarding spark timing. The controller may then adjust spark ignition timing for a cylinder combustion event based on the retarded spark timing relative to a threshold timing. Thus, if the retarded spark timing is beyond the threshold timing, or a torque ratio at the retarded spark timing is below a threshold ratio, the controller may selectively increase the ignition energy for the (given) cylinder combustion event. The spark ignition energy may be selectively increased for the given cylinder combustion event and reduced for a subsequent cylinder combustion event. The controller may increase an ignition coil dwell time as a difference between the retarded spark timing and the threshold timing increases or as a function of the torque ratio resulting from the applied spark retard. For example, as elaborated with reference to FIG. 4, the controller may initiate charging of the ignition coil at an earlier time so that spark generation (and cylinder combustion) can occur at the requested retarded spark timing (and no later).

Now turning to FIG. 4, map 400 shows example combustion events wherein ignition coil dwell time is modulated in response to combustion timing being later than a threshold timing. In the depicted example, the engine uses at least some spark timing retard to address a transient over-torque condition. During late cylinder combustion events where ignition timing is later than a threshold, ignition dwell time in the cylinder is extended to address potential cylinder pre-ignition events arising from additional unintended spark delays. The sequence of events depicted in the example of FIG. 4 occurs during a compression stroke of a firing cylinder. The signals of FIG. 4 may be provided via the method of FIG. 3 in the system of FIGS. 1 and 2. Vertical markers t1-t3 represent times of interest between the three plots. Events between the three plots that align with the vertical marks occur at substantially the same time.

Map 400 depicts an ignition coil control signal at plots 401 and 402. Current flows into an ignition coil from a battery or alternator when the signal is at a higher level. Current does not flow from the battery or alternator to the ignition coil when the signal is at a lower level. Map 400 further depicts current flow into a primary coil of an ignition coil at plots 403 and 404. A horizontal line represents a level of zero current flow. Current amount increases in the direction of the Y axis arrow.

Before t1, the coil control signal (plots 401-402) as well as the ignition coil current (plots 403-404) are static. The coil control signal is at a lower level indicating that current flow into the ignition coil primary coil is inhibited as indicated by the ignition coil current being shown at substantially zero.

A first cylinder combustion event is shown at plots 401 and 403 (dashed lines) wherein ignition timing (not shown) includes a first amount of spark retard. In one example, the first amount of spark retard may be requested before t2 due to a sudden drop in torque demand (e.g., due to a transmission shift, engine idle speed over-speed condition, a transient change in requested EGR, a pedal tip-out, etc.) leading to an over-torque condition. During this condition, spark may be retarded from MBT (or borderline spark) to allow the torque produced to be rapidly lowered in order to meet the reduced torque demand. In particular, during the first cylinder combustion event, the first amount of spark retard may be a first smaller amount of spark retard (e.g., less than a threshold amount of spark retard) that retards combustion timing to within a threshold timing. Consequently, during the first combustion event, a smaller amount of torque reduction may be achieved with a relatively higher torque ratio. In response to the late combustion timing being within the threshold timing (or the first amount of spark retard being less than the threshold amount), the coil control signal is asserted at t2, as indicated by the coil control signal transitioning to a higher level at plot 401. Current begins to flow into the primary coil of the ignition coil as indicated at plot 403.

The coil control signal is asserted for a first duration d1 between t2 and t3. That is, at t3, the coil control signal transitions back to a lower level indicating that current flow to the primary coil ceases. The ignition coil current (plot 403) also transitions back to substantially zero after having ramped up to a first peak coil current 405. The duration between time t2 and t3 is the dwell time d1 or time to charge the ignition coil. The dwell time may be measured from the time when the coil control signal is asserted and current begins to flow into the primary side of the ignition coil to the time when the coil control signal is not asserted and when current flow into the primary coil ceases. Spark then ensues at t3. In particular, at t3, current flow through the primary coil ceases and the ignition coil generates a spark at the spark plug electrodes.

A second cylinder combustion event is shown at plots 402 and 404 (solid lines) wherein ignition timing (not shown) includes a second amount of spark retard. Herein, the second amount of spark retard is larger than the first amount of spark retard requested during the first cylinder combustion event. In one example, the second amount of spark retard may be requested before t1 due to a sudden drop in torque demand (e.g., due to a transmission shift, engine idle speed over-speed condition, a transient change in requested EGR, a pedal tip-out, etc.) leading to an over-torque condition. During this condition, spark may be retarded from MBT (or borderline spark) to allow the torque produced to be rapidly lowered in order to meet the reduced torque demand. In particular, during the second cylinder combustion event, the first amount of spark retard may be a second, larger amount of spark retard (e.g., more than a threshold amount of spark retard) that retards combustion timing to beyond a threshold timing. Consequently, during the second combustion event, a larger amount of torque reduction may be achieved with a relatively lower torque ratio. In response to the late combustion timing being outside of the threshold timing (or the second amount of spark retard being more than the threshold amount), the coil control signal is asserted at an earlier time t1, as indicated by the coil control signal transitioning to a higher level at plot 402. Current begins to flow into the primary coil of the ignition coil as indicated at plot 404.

The coil control signal is asserted for a second duration d2, between t1 and t3. The time between time t1 and t3 is the dwell time d2 or time to charge the ignition coil. The dwell time may be measured from the time when the coil control signal is asserted and current begins to flow into the primary side of the ignition coil to the time when the coil control signal is not asserted and when current flow into the primary coil ceases. Spark then ensues at t3. In particular, at t3, current flow through the primary coil ceases and the ignition coil generates a spark at the spark plug electrodes. In the depicted example, the second dwell time d2 is extended from the first dwell time d1 in response to the combustion timing being retarded beyond the threshold timing. At t3, the coil control signal transitions back to a lower level indicating that current flow to the primary coil ceases. The ignition coil current (plot 404) also transitions back to substantially zero after having ramped up to a second peak coil current 406. Herein, due to the longer ignition coil dwell time of the second cylinder combustion event (d2 being larger than d1), a higher peak coil current 406 is achieved as compared to the lower peak coil current 405 of the first cylinder combustion event.

It will be appreciated that as used herein, extending the ignition coil dwell time includes initiating charging of the ignition coil at an earlier time (as shown, charging of the ignition coil is initiated at t1 rather than t2 during the second cylinder combustion event) so that the ignition coil is discharged at the same time (that is, at the same retarded spark timing). In addition, extending the ignition coil dwell time includes charging the ignition coil to a higher peak coil current and discharging the ignition coil at (or from) the higher peak coil current.

It will be appreciated that while the given example shows each of the first cylinder combustion event and the second cylinder combustion event being retarded to the same spark timing (t3), the two combustion events occur under different engine operating conditions wherein the threshold timings are different. As a result, the given retarded spark timing (t3) during the first cylinder combustion event represents a spark timing that is within a threshold timing and with a lower amount of spark retard while the given retarded spark timing (t3) during the second cylinder combustion event represents a spark timing that is outside of a threshold timing and with a higher amount of spark retard.

Even though spark is generated at t3, an actual cylinder combustion event may occur after a delay, or duration since the spark event. This delay or spark duration may be based not only on cylinder conditions but also based on the amount of spark ignition energy that is output. Thus, due to the relatively lower spark ignition output energy during the first combustion event, the actual combustion event may occur after a longer duration since the spark event while due to the relatively higher spark ignition output energy during the second combustion event, the actual combustion may occur after a shorter duration since the spark event (e.g., substantially immediately upon spark discharge). This means that the first cylinder combustion event may be delayed more due to the shorter dwell time while the second cylinder combustion event may be delayed less due to the longer dwell time. As such, during the first cylinder combustion event, the later than intended combustion can raise the amount and temperature of exhaust residuals generated in the cylinder, leading to a possibility of pre-ignition in the firing cylinder on the next combustion event, as well as in neighboring cylinders receiving exhaust residuals from the firing cylinder. In comparison, during the second cylinder combustion event, the possibility of a later than intended combustion event is reduced by temporarily increasing the ignition output via the increase in ignition coil dwell time.

As previously elaborated, the spark timing retard may make cylinder combustion more challenging at moderate loads, wherein increasing an ignition dwell time could help restore combustion location to a desired location. However, at high loads, the extra hot residuals generated in the firing cylinder may cause a pre-ignition event. In this case, depending on the cylinder conditions, a controller may enrich the firing cylinder to lessen the chance of pre-ignition, along with increasing spark energy to ignite the rich mixture. In an extreme late case with hot residuals, a controller may optionally not inject fuel to the cylinder to avoid pre-ignition, and also not adjust the ignition energy or dwell time.

Thus, as illustrated above, during a first combustion event in a cylinder, a controller may retard spark by a first, smaller amount and reduce torque by a first, smaller ratio while operating a spark ignition coil for a first, shorter dwell duration. In comparison, during a second combustion event in the cylinder, the controller may retard spark by a second, larger amount, and reduce torque by a second, larger ratio while operating the spark ignition coil for a second, longer dwell duration.

In this way, by temporarily increasing spark ignition output in a cylinder undergoing a late combustion event, unintended spark delays can be reduced and a later than intended combustion event can be mitigated. By better enabling a combustion event to initiate without unintended delays, the risk of late burn induced cylinder pre-ignition events in the firing cylinder, as well as in a cylinder configured to receive exhaust residuals from late combusting cylinder, can be reduced. Overall, engine degradation due to pre-ignition can be mitigated.

Figure 4:
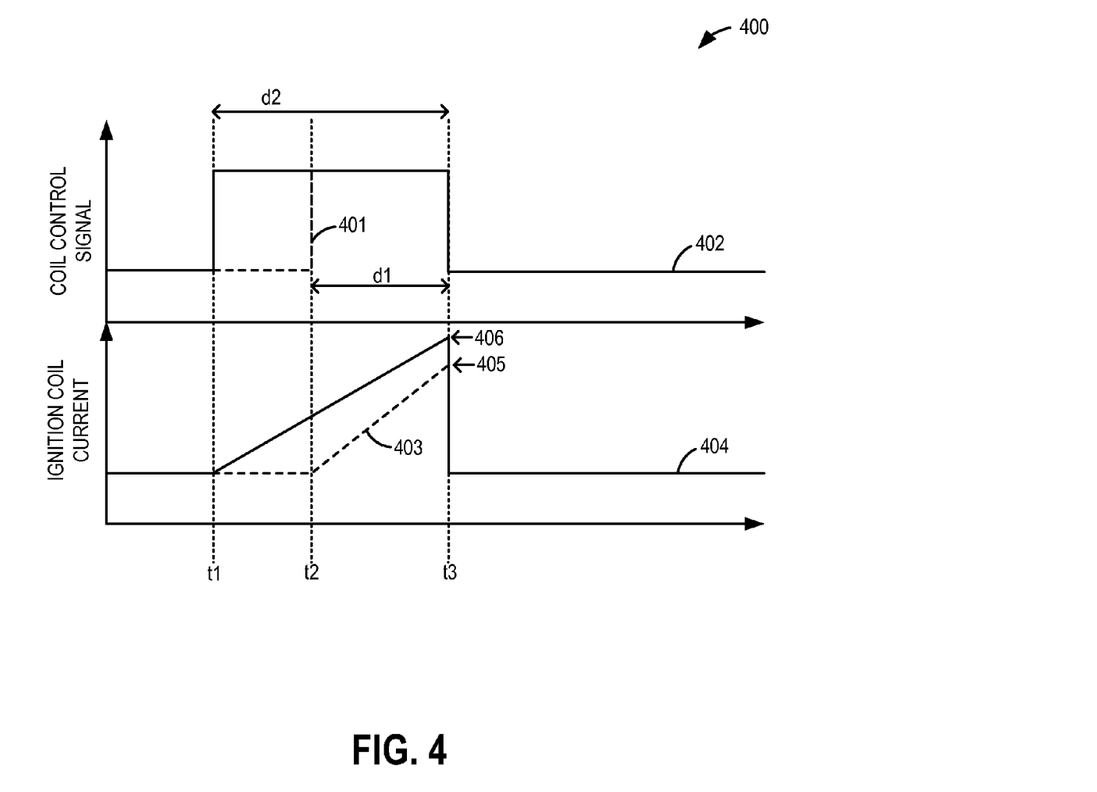
FIG. 4 shows example spark energy modulations, according to the present disclosure.

As will be appreciated by one of ordinary skill in the art, routines described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for an engine, comprising
in response to timing of combustion in a direct injection fueled cylinder being later than a threshold during a transient over-torque condition, temporarily increasing spark ignition output for the combustion, wherein the cylinder is a first cylinder, and wherein the increasing is performed to reduce a likelihood of pre-ignition in a second cylinder receiving exhaust residuals from the first cylinder.

2. The method of claim 1, wherein the transient over-torque condition is due to one of a tip-out, a transmission shift, an engine idle speed over-speed condition, and a transient change in requested EGR.

3. The method of claim 1, wherein increasing spark ignition output includes extending a dwell time of a spark ignition coil.

4. The method of claim 3, wherein the extending of the dwell time is based on a torque ratio of desired combustion timing to actual combustion timing.

5. The method of claim 1, wherein the combustion in the cylinder is a first combustion event, and wherein temporarily increasing spark ignition output includes increasing spark ignition output for the first combustion event in the cylinder and resuming spark ignition output for a second, subsequent combustion event.

6. The method of claim 1, wherein the threshold is based on one or more of a pre-ignition history of the first cylinder, a pre-ignition history of the second cylinder, an amount of EGR in the first cylinder, and an amount of exhaust residuals in the first cylinder.

7. The method of claim 1, further comprising, selectively enriching the second cylinder based on the timing of combustion in the first cylinder, a degree of richness increased as a difference of the combustion timing in the first cylinder from the threshold increases.

8. A method for an engine, comprising:
operating the engine with boost and direct fuel injection; and
in response to timing of combustion in a first cylinder being later than a threshold, transiently increasing spark ignition energy for the combustion in the first cylinder, the threshold based on a pre-ignition count of a second cylinder receiving exhaust residuals from the first cylinder during a valve overlap period.

9. The method of claim 8, wherein the threshold is lowered as the pre-ignition count of the second cylinder increases.

10. The method of claim 8, wherein the threshold is further based on a pre-ignition count of the first cylinder, the threshold lowered as the pre-ignition count of the first cylinder increases.

11. The method of claim 8, wherein the threshold is further based on an air mass flow to the engine, the threshold lowered during high air mass flow conditions.

12. The method of claim 8, wherein the combustion in the first cylinder is a first combustion event in the first cylinder and wherein the spark ignition energy is transiently increased for the first combustion event, and wherein the spark ignition energy is reduced for a second, immediately subsequent combustion event in the first cylinder.

13. The method of claim 8, wherein selectively increasing the spark ignition energy includes increasing an ignition coil dwell time, the dwell time increased as a difference between the timing of combustion in the first cylinder and the threshold increases.

14. The method of claim 13, wherein increasing the ignition coil dwell time includes one or more of initiating charging of an ignition coil at an earlier time and charging the ignition coil to a higher peak coil current.

15. The method of claim 8, wherein the threshold is further based on an amount and temperature of exhaust residuals in the first cylinder.

16. The method of claim 8, further comprising, selectively enriching the second cylinder in response to the timing of combustion in the first cylinder being later than the threshold, a degree of richness of the selectively enriching increased as a difference between the timing of combustion in the first cylinder and the threshold increases.

17. An engine system, comprising:
an engine including a plurality of cylinders;
a direct fuel injector coupled in each of the plurality of cylinders;
a spark plug coupled in each of the plurality of cylinders;
a transmission;
a turbocharger for providing engine boost;
an ignition coil supplying electrical energy to a spark plug; and
a control system with computer-readable instructions for, during a transmission shift,
retarding spark ignition timing in a first cylinder to reduce combustion torque;
increasing an ignition coil dwell time during a combustion event in the first cylinder based on a torque ratio achieved in the first cylinder at the retarded spark ignition timing; and
enriching a second cylinder receiving exhaust residuals from the first cylinder during a valve overlap period, a degree of richness of the enriching based on the torque ratio in the first cylinder.

18. The system of claim 17, wherein increasing the ignition coil dwell time based on the torque ratio includes increasing based on the torque ratio at the retarded spark ignition timing relative to a threshold, and wherein increasing the ignition coil dwell time includes each of initiating charging of an ignition coil at an earlier time so as to discharge the ignition coil at the retarded spark ignition timing and charging the ignition coil to a higher peak coil current.

19. The system of claim 18, wherein the threshold is based on one or more of a cylinder load of the first cylinder, an amount of exhaust residuals generated in the first cylinder, an engine boost level, a temperature of exhaust residuals generated in the first cylinder, an amount of EGR in the first cylinder, and a pre-ignition history of the second cylinder.

* * * * *